Dec. 24, 1940.     B. E. PRICE     2,225,798
PROPORTIONAL SAMPLER
Filed Dec. 15, 1937     3 Sheets-Sheet 1
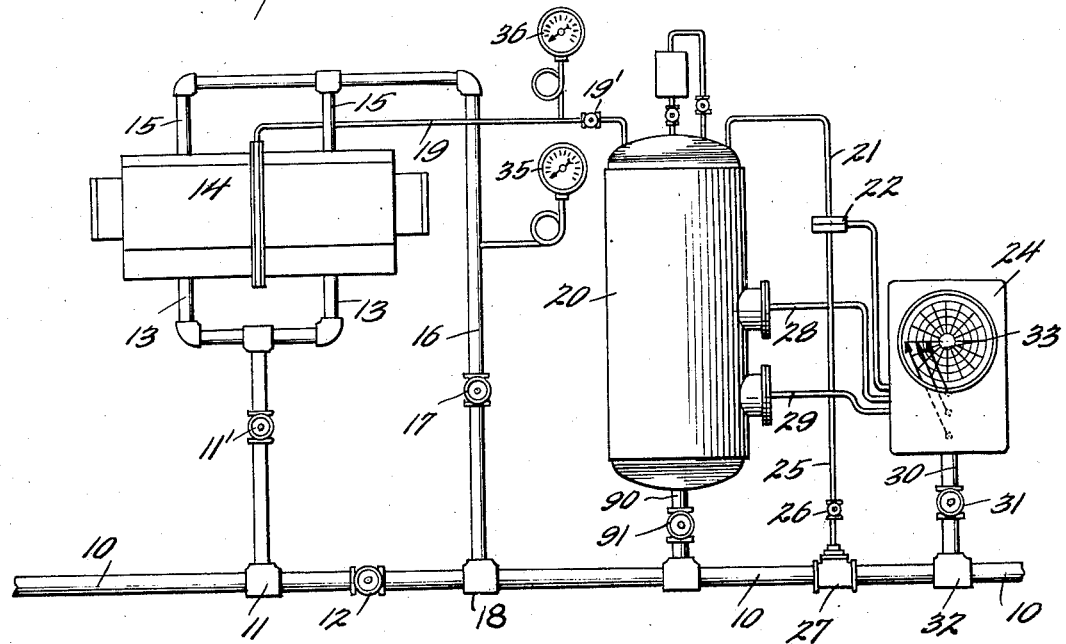
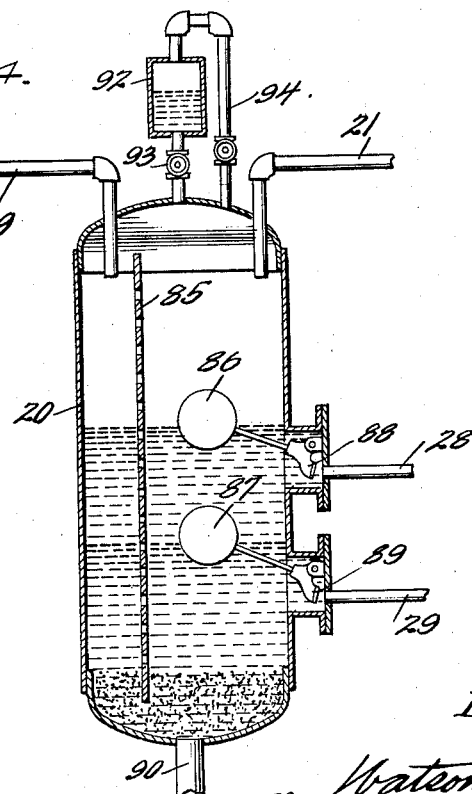
Inventor
Bailey E. Price,
By Watson, Coit, Morse & Grindle
Attorney Dec. 24, 1940.    B. E. PRICE    2,225,798
PROPORTIONAL SAMPLER
Filed Dec. 15, 1937    3 Sheets-Sheet 2
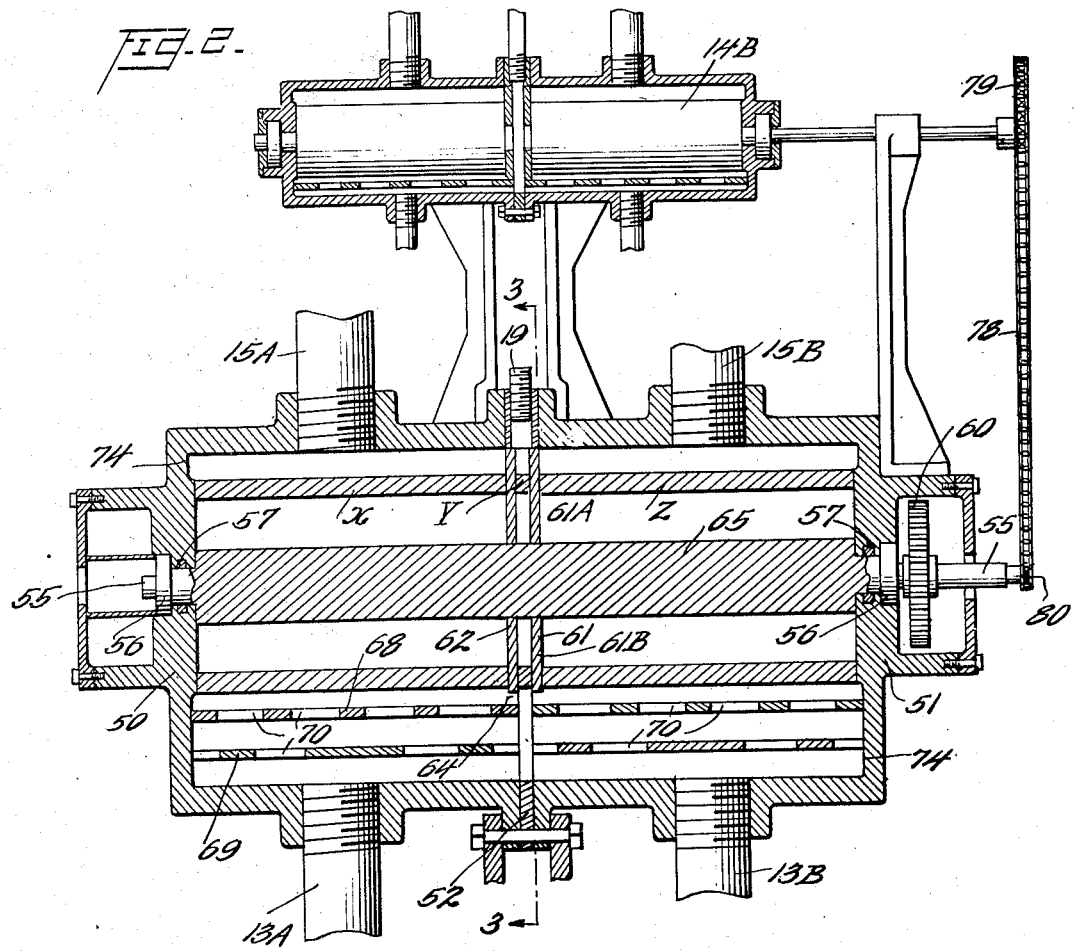
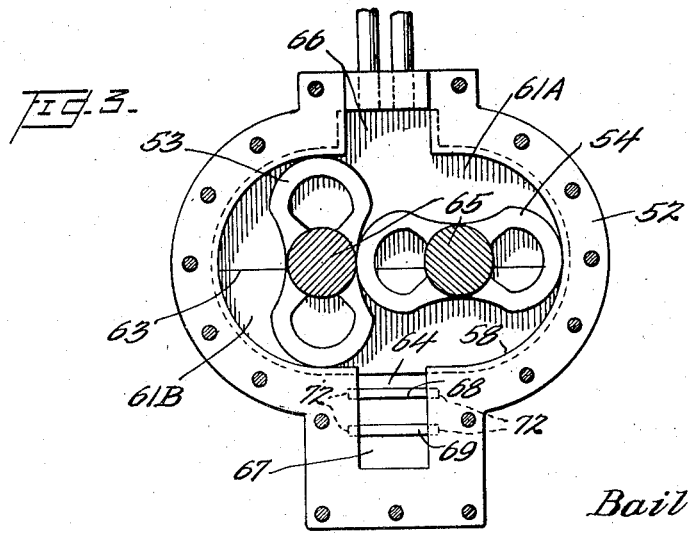
Inventor
Bailey E. Price,
By Watson, Coit,
Morse & Grindle
Attorney

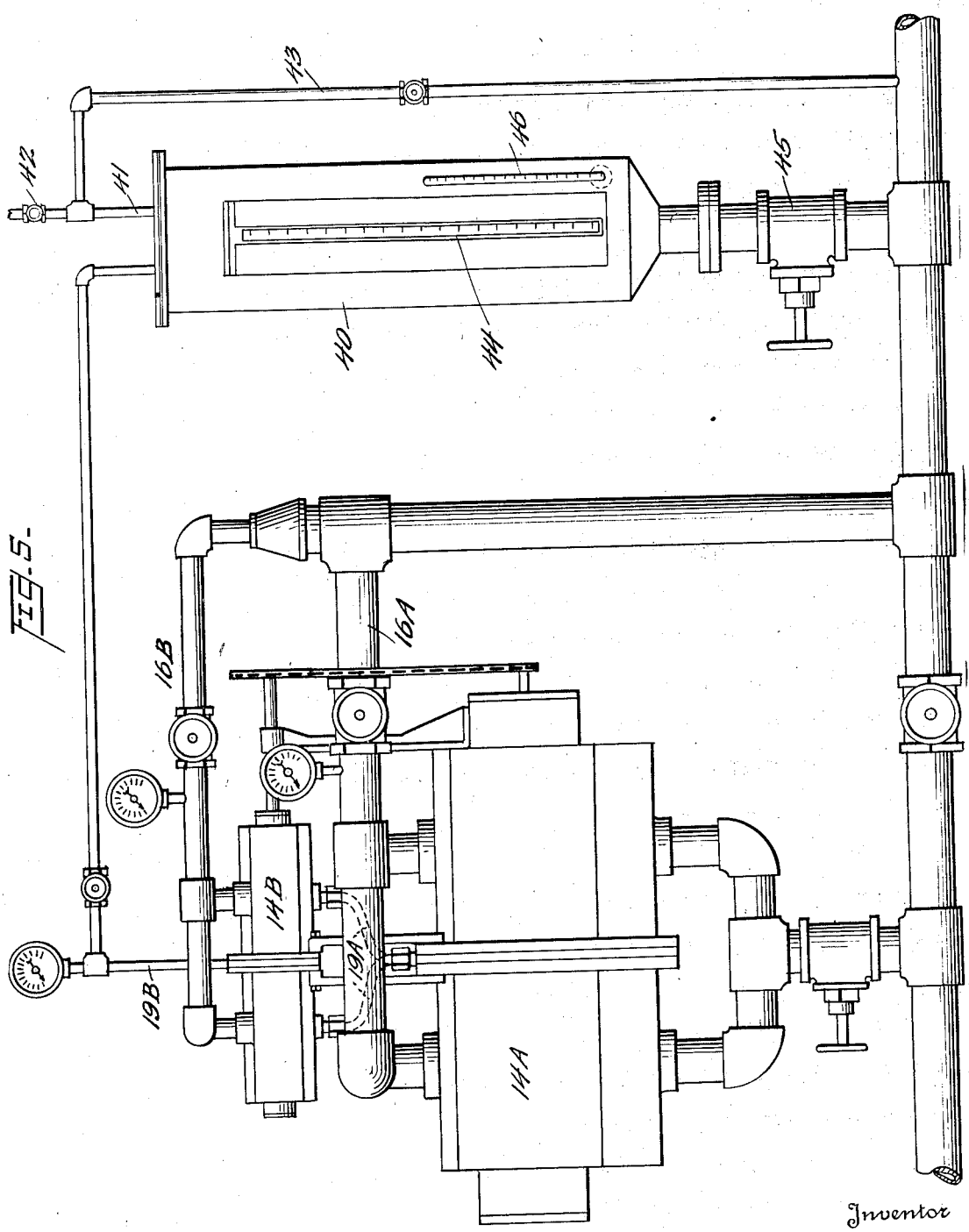

Patented Dec. 24, 1940

2,225,798

UNITED STATES PATENT OFFICE 2,225,798

PROPORTIONAL SAMPLER

Bailey E. Price, Columbus, Ohio

Application December 15, 1937, Serial No. 179,983

5 Claims. (Cl. 73—21)

This invention relates to proportional samplers.

An important feature of the present invention consists in the provision of proportioning equipment whereby a mixture of several liquids and a gas is first proportioned accurately without segregation and a small sample of the same of definite ratio to the main bulk is taken.

A further important feature of the invention resides in the construction of the sampling or proportioning means whereby it accurately cuts out a predetermined fraction of the main quantity of flow so that this fraction can be metered and hence the total quantity of flow determined.

The invention also contemplates, in simpler form, a proportioning or sampling means which in several stages cuts out a very minute sample of known ratio to the total flow of mixed fluids and introduces the same into a measuring tank of adequate capacity to hold the sample as delivered over a reasonable period of time and which indicates the quantity of each ingredient of the mixture.

Important features of the various parts of the invention are involved in the details of construction and arrangement of parts and these will be more apparent to those skilled in the art upon a consideration of the accompanying drawings and following specification wherein is disclosed an exemplary embodiment of the invention with the understanding, however, that such changes may be made therein as fall within the scope of the appended claims without departing from the spirit thereof.

In said drawings:

Figure 1 is an elevation in schematic form of the complete assemblage of parts comprising the preferred embodiment of the invention, intended for continuous metering of oil well effluent;

Figure 2 is a vertical longitudinal section through a proportioning or sampling device adapted for use with either embodiment of the invention;

Figure 3 is a transverse vertical section on line 3—3 of Figure 2;

Figure 4 is a vertical section through the separating tank of Figure 1; and

Figure 5 is a view similar to Figure 1 of the second embodiment of the meter intended for batch measurement of oil well effluent.

Meters according to the present invention have been primarily devised for the measurement of the mixed fluids discharged from an oil well, although most features thereof are equally as well adapted for measuring any fluid, particularly mixed fluids capable of segregation into their components by standing, with or without the assistance of demulsifiers or separating agents.

The present meter is primarily intended for connection directly to the output of an oil well where it receives not only a mixture of water and oil but usually a considerable quantity of gas under pressure. The separator portion of the meter is capable of segregating the liquids so that they can be independently measured and of permitting the gases to discharge under their own pressure and be measured.

In order to reduce the very large quantity of oil well effluent to a readily measurable and alliquot part thereof, resort is had to a novel proportioning or sampling device which ensures an accurate sample of known ratio to the total of the mixed fluids and the constituent parts of which are of the same ratio to the amounts of each in the whole mixture.

Referring now to the drawings and first to the preferred embodiment which constitutes a meter capable of continuous operation, there is shown in Figure 1 at 10 a suitable pipe leading from an oil well to a reservoir or place of use of the liquid and having a T 11 ahead of the valve 12, which is normally closed, whereby liquid is delivered to the two branches 13 leading to the sampler 14 which will be later described. This sampler divides the total flow of liquid into two parts, the larger of which is discharged through the pipes 15, combined into the return pipe 16 leading back through the valve 17 to the pipe 10 at the T 18.

The smaller proportion or sample is discharged through the pipe 19 into the separator and settling tank 20, to be described more in detail in connection with Figure 4. For the present description it is sufficient to say that this tank permits the separation of the gas from the liquid mixture which gas is led off through the pipe 21 under its own pressure, where it passes through an orifice at 22 of a conventional type orifice meter, the recording portion of which is incorporated in the device 24. The gas passing through the orifice 22 continues through the pipe 25 and valve 26 to the T 27 in the main pipe line 10.

The mixture of liquids is caused to settle and segregate in the tank 20 and the lighter liquid, in this case oil, is discharged through the pipe 28 while the heavier liquid, water, is discharged through the pipe 29. These two pipes each lead to a separate liquid meter (not shown), preferably a simple gear type. These meters are of conventional construction and incorporated in the apparatus 24. From these meters the mixture of liquids is returned to the pipe line 10 by way of pipe 30, valve 31 and T 32. The two parts into which the liquid flow has been divided are now recombined and the liquid is delivered for any further treatment or use still under the pressure at which it was introduced from the well.

The recording mechanism 24 may constitute a timed and power driven chart over which several pens 33 are caused to operate, each driven by one of the meters all in a manner well known.

The valve 11' can be shut off to cut out the sampler and meters and the valve 12 opened to permit direct flow through the pipe line 10 when desired. Normally the valve 12 is closed and the valve 11' opened. The valves 17 and 19' controlling the discharges of the remainder of the mixed liquid and the sample are each preceded by a pressure gauge respectively 35 and 36 so that these two valves may be adjusted to produce identical pressures in the pipe lines 19 and 16, thereby balancing the sampling device and ensuring accurate proportioning thereby.

The second embodiment of the invention shown in Figure 5 need not be entirely described in detail for its piping connections are substantially identical with those already described, but the sampling mechanism is changed in this manner. The main or primary sampler 14A is identical with that shown in Figure 1 and may cut out a sample of any desired ratio, say $\frac{1}{50}$ of the total liquid flowing through the sampler. This is delivered by pipes 19A to a secondary and substantially similar sampler 14B of much smaller size since it handles only the 50th part of the total liquid delivered to the sampler 14A. This secondary sampler may then cut out a sample of any desired ratio, say $\frac{1}{50}$ of the liquid delivered to it which is discharged through the pipe 19B for measurement. The larger proportions from the two samplers are returned by the pipes 16A and 16B to the main line as in the first case.

The fluid delivered through the pipe 19B is $\frac{1}{50}$ of $\frac{1}{50}$ or $\frac{1}{2500}$ of the original quantity of liquid supplied to the primary sampler and it is discharged into a settling and measuring tank 40 of sufficient capacity to hold the sample delivered during a period of say 12 or 24 hours. Within this tank the gas is separated by agitation and standing and is discharged through the pipe 41 which through the valve 42 may discharge the gas to atmosphere or alternatively through the pipe 43 return it to the main line. If desired, the pipe 43 may have incorporated therein a conventional orifice meter, as described in connection with Figure 1, for measuring and recording the quantity of gas flow.

The tank 40 is equipped with a suitable gauge glass or the like 44 with graduations calibrated for instance in barrels of actual liquid discharged from the well. The line of demarcation between the oil and water is readily visible so the quantity of each accumulated in the period since the tank was last emptied through its valve 45 into the main pipe can be readily ascertained. A thermometer 46 may be arranged with its bulb in the liquid in the tank so that corrections for temperatures can be effected if necessary. This batch form of meter is naturally cheaper than the continuous type of Figure 1 and is entirely satisfactory for small outputs.

The sampler is the most important device in the meter since the accuracy of the whole apparatus depends on the degree of care in its design and construction and on the accuracy with which it is enabled under all conditions of output and wear to cut out a predetermined portion of the whole quantity of liquid for measurement. Since the output of an oil well may run into a great number of barrels per day, it is seen that it becomes almost essential to use some proportioning means whereby but a small quantity of the total output can be measured and recorded in terms of the total output.

The sampling device illustrated in Figure has for convenience incorporated in it the second or subsidiary sampler of the embodiment of the invention shown in Figure 5, but by the mere omission of this part the sampler illustrated is satisfactory for use in the arrangement of Figure 1.

In principle the sampler comprises a pump of the well known gear or lobe type operated in reverse, i. e., the gears are driven by the liquid flowing through the device. If, with careful designing, the liquid of say $\frac{1}{50}$ of the axial length of the gears can be cut out or segregated, then in theory that liquid should represent $\frac{1}{50}$ of the total quantity flowing through the sampler. Such a gear or lobe pump, when new and tight, will deliver fluid by volume proportional to the volume displaced by the teeth of the gears. When worn the slippage will be uniform throughout the length of the gears and will not affect the ratio of delivery of the main and sampling lengths of the gears.

Referring now to Figures 1, 2 and 3, it will be seen that the main casing of the sampler 14 is composed of two castings 50 and 51 identical in construction so that they can be used interchangeably. These are generally of cup shape with closed outer ends and outwardly flanged open inner ends. They are assembled with their flanged ends adjacent each other but separated by a spacer plate 52 and suitable gaskets as more clearly shown in Figure 3. This spacer plate in the instant case is of a thickness equivalent to $\frac{1}{50}$ of the total active length of the casing. The spacer is thickened at the top as shown to receive the end of the pipe 19 for carrying off the sample.

The casing houses a pair of meshed toothed or lobed elements 53 and 54 of identical construction and mounted for rotation on parallel axes formed by extensions 55 of the central portions thereof. Suitable supports such as the ball bearings 56 mount the rotors from the end plates of the castings of the housing and packings 57 may be provided to prevent leakage.

The rotors 53 and 54 are preferably of the shape indicated in cross section in Figure 3 although they might be of the usual multi-toothed gear type if desired. Their ends closely fit against the end wall of the casing as shown. The rotors each have configurations which are combinations of epi- and hypo-cycloids so that they interfit as shown and at all times are substantially in contact with each other whereby no fluid can pass between the rotors. Likewise at least one lobe of each rotor is in engagement or substantially so with the semi-circular periphery 58 of its side of the casing. In operation the liquid under pressure flowing upwardly, in Figure 3, bears on the outer lobes, rotates the rotors so that their inner lobes move downwardly and the liquid passes out from the upper side of the casing. All liquid passing through is effective to rotate the rotors and is directly in ratio to the rotor speeds, assuming that there is no leakage.

In order to prevent undue wear on the rotors where they engage each other, it is preferred to gear the two shafts thereof together through the spur gears 60, shown in Figure 2, which are outside of the main casing and on the extensions of the stub shafts of the rotors. These gears equalize the driving effort which is not uniform on any one rotor so that the wear within the casing is reduced. The outer gears can readily be replaced when worn.

In addition to the separator plate 52 there are two spacer plates 61 and 62, each in two parts shown in Figure 3 as 61A and 61B having a tongue and groove junction 63 substantially on the axes of the two rotors. The plates are mounted with their peripheries in grooves in the casing castings 51 and 52. Each of these plates closes up its half of the casing except at the bottom at 64 where fluid enters. These plates 61 and 62 operate in slots in the rotors which extend down to the circular centers 65 thereof so that all eccentric portions of the rotors, i. e., the lobes or teeth pass on opposite sides of these plates in a substantially fluid tight manner. This then divides each rotor lobe into sections which for convenience may be indicated by the reference characters X, Y and Z. For convenience X and Z are each of the same axial length whereas Y is, in the present instance, only 1/50 of the length axially of the sum of X, Y and Z, and therefore the portion Y isolated from X and Z permits only 1/50 as much liquid to pass as passes through the sections X, Y and Z together.

The section X delivers into discharge pipe 15A and the section Z into discharge pipe 15B while the section Y delivers into discharge pipe 19 and enters into the space between the plates 61 and 62. In each case the discharge is from the enlarged discharge bay 66 at the top of the casing, which is divided into three chambers by extensions on the spacer plates 61 and 62 as shown in Figure 2.

A somewhat similar but deeper bay 67 at the bottom of the casing extends through all three compartments and is provided with a plurality of horizontal baffle plates here shown as two, 68 and 69, perforated with apertures 70 of any desired shape and so sized and disposed that fluid entering the pipes 13A and 13B in the portions of the bay 67 centrally of the sections X and Z has substantially the same distance to travel to reach any portion of the adjacent rotor. This ensures a uniform distribution of the mixed fluid, tends to eliminate segregation, applies substantially the same pressure to each increment of the rotors and ensures accurate and uniform sampling. The plates 68 and 69 are received in slots 72 in the walls of the bay 67.

To assist in uniform operation and to eliminate the drag of stationary liquid, the end walls of the casing abut the rotors at right angles with a close fit only for the diameter of the lobes and are cut away beyond this diameter as shown at 74, not only increasing the accuracy but providing a space for the accumulation of any wax where it will not interfere with the operation of the sampler.

The sampler functions equally as well when worn as when new and the wear will be substantially uniform throughout the length of the rotors and any leakage in one section will be reproduced in kind in the other so that the proportion remains constant. It must be remembered that the rotations of the sampler are not counted for measuring but the device is merely relied on for cutting out a definite portion of the total flow. This form of sampler is self-cleaning. Paraffin or other deposits do not affect the total displacement of the sampler as would be the case in a device where there is no wiping action over the entire surface.

In Figure 2 the secondary sampler 14B is shown to be substantially identical in construction to the main one and no details are disclosed. Its two feed pipes are supplied from the discharge 18 from the sampler section of the main device. The secondary sampler operates exactly as the primary one and cuts out its sample, in this case 1/50 of the sample from the primary device.

While it is considered desirable to permit the secondary sampler to be driven by the flow of the liquid it may sometimes be found that because of its small size and the drag of thick fluid, it is desirable to drive the same from the more powerful main sampler which can conveniently be done by chain 78 running over the sprockets 79 and 80 on the secondary and primary shafts, respectively, a suitable diameter ratio thereof being predetermined.

The separator tank 20 of Figure 1 is shown in greater detail in Figure 4. The entering pipe 19 is at one side of the vertical center and terminates just below the top so that the liquid is splashed down into the tank with considerable violence to agitate it and assist in the separation of the gas. To prevent violent surging of the liquid in the lower part of the tank which houses the floats, a perforated baffle plate 85 extends from substantially the top to the bottom of the tank in a chordal manner so that the pipe 19 delivers in the smaller portion of the tank separated thereby. The other and larger portion of the tank accommodates ball floats 86 and 87 each in control of a discharge valve 88 and 89 respectively. The float 87 is designed to have such buoyancy that it will only open its valve 89 when supported in a liquid at least as heavy as water and when the float is a considerable distance above the level of the discharge of the valve 89. Likewise the float 86 is intended to open its valve 88 when buoyed up by a lighter liquid such as oil having its level substantially above that of the valve opening 88. In this manner the valves are so controlled that each one discharges only a liquid of one type and each closes when there is insufficient of that liquid to be discharged through it.

Gas escapes through the pipe 21 which leads to the orifice meter, oil escapes through the pipe 28, and water through the pipe 29. A discharge pipe 90 from the bottom of the tank is provided which connects through a valve 91 to the main line 10. This permits draining of the tank and the elimination of any accumulated sand, mud, dirt, sludge, wax or the like. It should be noted here that this separator tank is instrumental in allowing the settling out of undesirable foreign matter which might interfere with the operation of the subsequent meters. The large volume of quiescent liquid essential to the separation of the previously mixed liquids permits of the settling out of foreign matter which can be drained off from time to time.

In the event that it is found essential to use some chemical to assist in the separation of the water and the oil, it can be delivered from the reservoir 92 by means of a dripper valve 93 into the liquid in the tank 20. The pressure in the reservoir 92 may be equalized through the pipe 94 extending from the top of the tank 20.

The actual meters for measuring the liquids and for recording the same have not been illustrated except conveniently at 24 and 33 and they can be any commercial type, preferably combined so that they all record on the same chart. It is simple to calibrate them to indicate in terms of the total quantity of liquid flowing through the pipe 10 even though they measure only a small fraction thereof.

Having thus described the invention, what is claimed as new and desired to be secured by Letters Patent is:

1. A sampling device for cutting out a definite portion of a flowing liquid for subsequent measurement comprising, in combination, a closed casing, having sides of cylindrical arcs, a pair of cooperating rotors journalled for operation in said casing by the whole flow of liquid therethrough, each rotor cooperating with one of said arcuate sides to exclude leakage thereby, the ends of said casing being flat and cooperating with the rotors to prevent leakage thereby, said ends being deeply relieved for all area not swept by the rotors, means dividing said casing and rotors transversely into main and sampling sections of predetermined flow ratio, means to deliver all liquid to the inlet side of said casing and means to discharge the main and sample portions separately from the casing sections.

2. A sampling device for cutting out a definite portion of a flowing liquid for subsequent measurement comprising, in combination, a closed casing, having sides of cylindrical arcs, a pair of cooperating rotors journalled for operation in said casing by the whole flow of liquid therethrough, each rotor cooperating with one of said arcuate sides to exclude leakage thereby, the ends of said casing being flat and cooperating with the rotors to prevent leakage thereby, said casing having an inlet bay and a discharge bay oppositely disposed and separating said arcuate sides, a pair of separator plates extending transversely across said casing and discharge bay to divide them into main and sample sections, said rotors being slotted to have their eccentric parts pass on opposite sides of said plates and to be divided by them into main and sample delivery sections.

3. A sampling device for cutting out a definite portion of a flowing liquid for subsequent measurement comprising, in combination, a closed casing, having sides of cylindrical arcs, a pair of cooperating rotors journalled for operation in said casing by the whole flow of liquid therethrough, each rotor cooperating with one of said arcuate sides to exclude leakage thereby, the ends of said casing being flat and cooperating with the rotors to prevent leakage thereby, said casing having an inlet bay and a discharge bay oppositely disposed and separating said arcuate sides, a pair of separator plates extending transversely across said casing and discharge bay to divide them in main and sample sections, said rotors being slotted to have their eccentric parts pass on opposite sides of said plates and to be divided by them into main and sample delivery sections, and means in said inlet bay to distribute entering liquid uniformly along the whole length of said rotors.

4. A sampling device for cutting out a definite portion of a flowing liquid for subsequent measurement comprising, in combination, a closed casing, having sides of cylindrical arcs, a pair of cooperating rotors journalled for operation in said casing by the whole flow of liquid therethrough, each rotor cooperating with one of said arcuate sides to exclude leakage thereby, the ends of said casing being flat and cooperating with the rotors to prevent leakage thereby, said casing having an inlet bay and a discharge bay oppositely disposed and separating said arcuate sides, a pair of separator plates extending transversely across said casing and discharge bay to divide them into main and sample sections, said rotors being slotted to have their eccentric parts pass on opposite sides of said plates and to be divided by them into main and sample delivery sections, and means in said inlet bay to distribute entering liquid uniformly along the whole lengths of said rotors, said means comprising spaced plates extending longitudinally of said bay and so perforated as to provide substantially the same length path for all liquid from the entrance to any part of the rotor length.

5. A sampling device for cutting out a definite portion of a flowing liquid for subsequent measurement comprising, in combination, a closed casing having sides of cylindrical arcs, a pair of cooperating rotors journalled for operation in said casing by the whole flow of liquid therethrough, each rotor cooperating with one of said arcuate sides to exclude leakage thereby, the ends of said casing being flat and cooperating with the rotors to prevent leakage thereby, said casing having an inlet bay and a discharge bay oppositely disposed and separating said arcuate sides, a pair of separator plates extending transversely across said casing and discharge bay to divide them into main and sample sections, said rotors being slotted to have their eccentric parts pass on opposite sides of said plates and to be divided by them into main and sample delivery sections, said casing ends being deeply relieved in said bays and all other area not swept by said rotor ends.

BAILEY E. PRICE.